United States Patent
Cohen et al.

(10) Patent No.: US 8,954,796 B1
(45) Date of Patent: Feb. 10, 2015

(54) RECOVERY OF A LOGICAL UNIT IN A CONSISTENCY GROUP WHILE REPLICATING OTHER LOGICAL UNITS IN THE CONSISTENCY GROUP

(75) Inventors: Saar Cohen, Moshav, Mishmeret (IL); Assaf Natanzon, Tel Aviv (IL)

(73) Assignee: EMC International Company, Hamilton (BM)

( * ) Notice: Subject to any disclaimer, the term of this patent is extended or adjusted under 35 U.S.C. 154(b) by 325 days.

(21) Appl. No.: 13/533,137

(22) Filed: Jun. 26, 2012

(51) Int. Cl.
    *G06F 11/00* (2006.01)
(52) U.S. Cl.
    USPC ............................................ 714/15; 707/674
(58) Field of Classification Search
    USPC .................. 714/15, 16, 19, 20; 707/674, 683
    See application file for complete search history.

(56) References Cited

U.S. PATENT DOCUMENTS

| | | | | |
|---|---|---|---|---|
| 7,627,612 | B2 * | 12/2009 | Ahal et al. | 1/1 |
| 7,627,687 | B2 * | 12/2009 | Ahal et al. | 709/233 |
| 7,774,565 | B2 * | 8/2010 | Lewin et al. | 711/162 |
| 8,364,648 | B1 * | 1/2013 | Sim-Tang | 707/674 |
| 8,600,945 | B1 * | 12/2013 | Natanzon et al. | 707/648 |
| 8,712,962 | B1 * | 4/2014 | Natanzon et al. | 707/634 |

OTHER PUBLICATIONS

The Design of New Journaling File Systems:The DualFS Case; Juan Piernas, Toni Cortes and Jose M. García, IEEE Transactions on Computers, vol. 56, No. 2, Feb. 2007, pp. 267-281.*

* cited by examiner

*Primary Examiner* — Marc Duncan
(74) *Attorney, Agent, or Firm* — Daly, Crowley, Mofford & Durkee, LLP

(57) ABSTRACT

In one aspect, a method includes recovering at least one logical unit of a consistency group in a journal-based replication system without interruption of replication of other logical units in the consistency group, the at least one logical unit being one of a physical logical unit or a virtual logical unit.

11 Claims, 7 Drawing Sheets

US 8,954,796 B1

RECOVERY OF A LOGICAL UNIT IN A CONSISTENCY GROUP WHILE REPLICATING OTHER LOGICAL UNITS IN THE CONSISTENCY GROUP

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Another conventional data protection system uses data replication, by creating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one aspect, a method includes recovering at least one logical unit of a consistency group in a journal-based replication system without interruption of replication of other logical units in the consistency group. The at least one logical unit is one of a physical logical unit or a virtual logical unit.

In another aspect, an article includes a non-transitory machine-readable medium that stores executable instructions. The instructions cause a machine to recover at least one logical unit of a consistency group in a journal-based replication system without interruption of replication of other logical units in the consistency group. The at least one logical unit is one of a physical logical unit or a virtual logical unit.

In a further aspect, an apparatus includes circuitry configured to recover at least one logical unit of a consistency group in a journal-based replication system without interruption of replication of other logical units in the consistency group. The at least one logical unit is one of a physical logical unit or a virtual logical unit.

DETAILED DESCRIPTION

Figure 1:
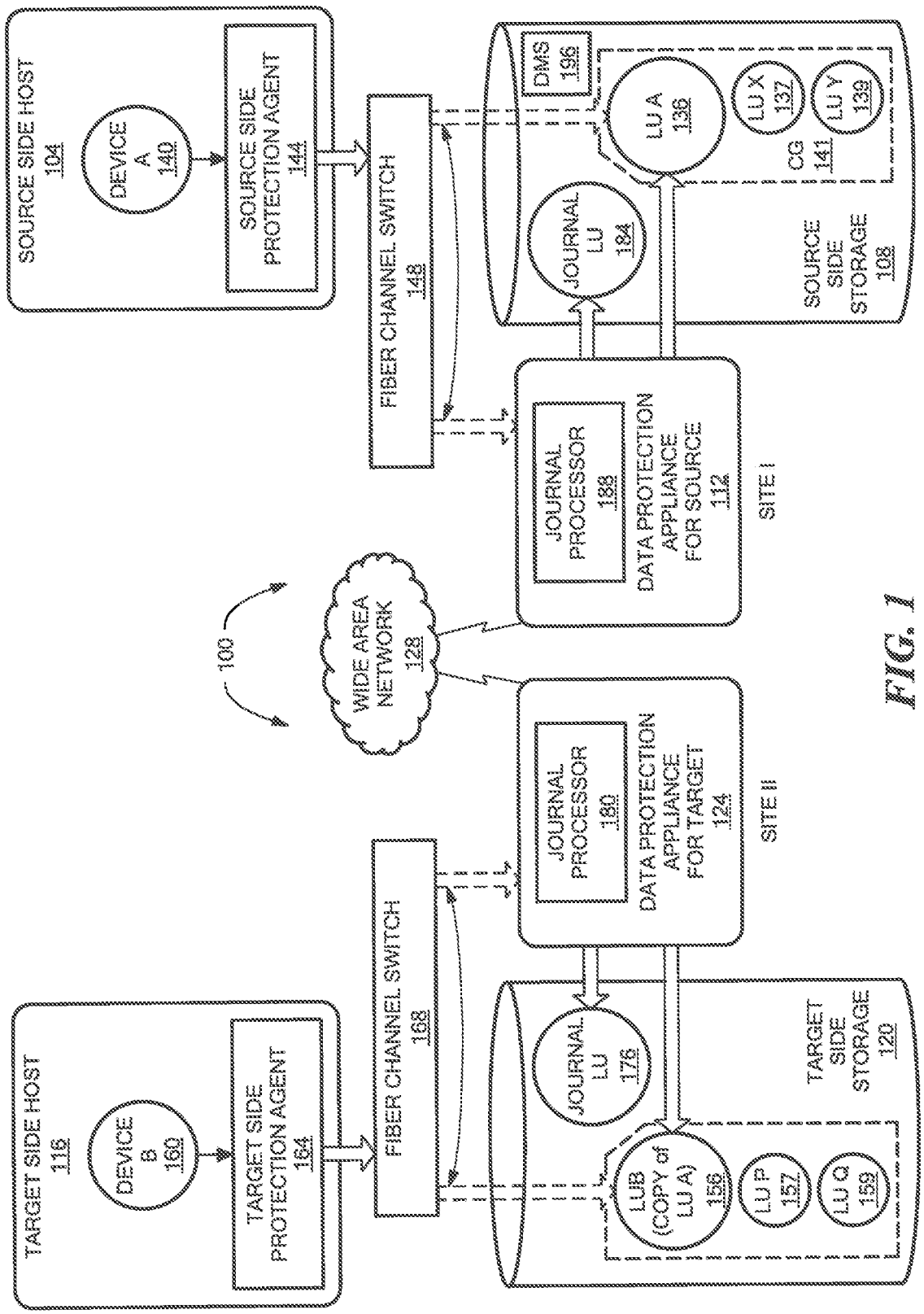
FIG. 1 is a block diagram of an example of a data protection system.

Described herein are techniques to recover a logical unit in a consistency group (CG) while replicating other logical units in the consistency group. The logical unit may be a physical logical unit or a virtual logical disk. The techniques presented herein avoid recovering the entire CG, i.e., stopping all production applications and recover each logical unit in the CG. The techniques described herein allow that while another logical unit is being recovered, there is no interruption to the replication of other logical units nor is their respective journaling lost. Since the logical unit may be a virtual logical unit, the techniques described are particularly important in virtualized environments, where the number of virtual logical units (virtual disks) and virtual machines may be very large, and a system with limited amount of consistency groups may be forced to group multiple virtual machines in a single consistency group and still be able to recover a single virtual machine.

The following definitions may be useful in understanding the specification and claims.

BACKUP SITE—a facility where replicated production site data is stored; the backup site may be located in a remote site or at the same location as the production site;

DATA PROTECTION APPLIANCE (DPA)—a computer or a cluster of computers responsible for data protection services including inter alia data replication of a storage system, and journaling of I/O requests issued by a host computer to the storage system;

CG—consistency group—a set of logical units (LUs) which are replicated together for which write order fidelity is preserved;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

I/O REQUEST—an input/output request which may be a read I/O request (read request) or a write I/O request (write request), also referred to as an I/O;

JOURNAL—a record of write transactions issued to a storage system; used to maintain a duplicate storage system, and to roll back the duplicate storage system to a previous point in time;

LOGICAL UNIT—a logical entity provided by a storage system for accessing data from the storage system. The logical disk may be a physical logical unit or a virtual logical unit;

LUN—a logical unit number for identifying a logical unit;

PHYSICAL LOGICAL UNIT—a physical entity, such as a disk or an array of disks, for storing data in storage locations that can be accessed by address;

PRODUCTION SITE—a facility where one or more host computers run data processing applications that write data to a storage system and read data from the storage system;

SPLITTER ACKNOWLEDGEMENT—an acknowledgement from a DPA to the protection agent that data has been received at the DPA; this may be achieved by SCSI status cmd.

SAN—a storage area network of nodes that send and receive I/O and other requests, each node in the network being an initiator or a target, or both an initiator and a target;

SOURCE SIDE—a transmitter of data within a data replication workflow, during normal operation a production site is the source side; and during data recovery a backup site is the source side;

STORAGE SYSTEM—a SAN entity that provides multiple logical units for access by multiple SAN initiators TARGET—a node in a SAN that replies to I/O requests;

TARGET SIDE—a receiver of data within a data replication workflow; during normal operation a back site is the target side, and during data recovery a production site is the target side;

VIRTUAL LOGICAL UNIT—a virtual storage entity which is treated as a logical unit by virtual machines;

WAN—a wide area network that connects local networks and enables them to communicate with one another, such as the Internet.

REMOTE ACKNOWLEDGEMENTS—an acknowledgement from remote DPA to the local DPA that data arrived at the remote DPA (either to the appliance or the journal)

A description of journaling and some techniques associated with journaling may be described in the patent titled "METHODS AND APPARATUS FOR OPTIMAL JOURNALING FOR CONTINUOUS DATA REPLICATION" and with U.S. Pat. No. 7,516,287, which is hereby incorporated by reference.

An Example of a Replication System

Referring to FIG. 1, a data protection system 100 includes two sites; Site I, which is a production site, and Site II, which is a backup site. Under normal operation the production site is the source side of system 100, and the backup site is the target side of the system. The backup site is responsible for replicating production site data. Additionally, the backup site enables roll back of Site I data to an earlier pointing time, which may be used in the event of data corruption of a disaster, or alternatively in order to view or to access data from an earlier point in time.

FIG. 1 is an overview of a system for data replication of either physical or virtual logical units. Thus, one of ordinary skill in the art would appreciate that in a virtual environment a hypervisor, in one example, may consume logical units and generate a distributed file system on them such as VMFS, generate files in the file system and expose the files as logical units to the virtual machines (each VMDK is seen as a SCSI device by virtual hosts). In another example, the hypervisor may consume a network based file system and expose files in the NFS as SCSI devices to virtual hosts.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks may be used.

Each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124. As well, the protection agent (splitter) may run on the host, or on the storage, or in the network or at a hypervisor level, and that DPAs are optional and DPA code may run on the storage array too, or the DPA 124 may run as a virtual machine.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

The host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. The logical unit may be a physical logical unit or a virtual logical unit. A logical unit is identified by a unique logical unit number (LUN). Storage system 108 exposes a logical unit 136, designated as LU A, and storage system 120 exposes a logical unit 156, designated as LU B.

LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, there is symmetric replication whereby some logical units of storage system 108 are used for replicating logical units of storage system 120, and other logical units of storage system 120 are used for replicating other logical units of storage system 108.

LU A is part of a CG 141 with other logical units (LU X 137 and LU Y 139). The other logical units (LU X 137 and LU Y 139) are replicated from the source side to the target side (i.e., from the production site I to the backup site II) to backup logical units (LU P 157 and LU Q 159, respectively) in the same manner as LU A is replicated to the backup logical unit LU B 156.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. Host device 104 identifies LU A and generates a corresponding host device 140, designated as Device A, through which it can access LU A. Similarly, host computer 116 identifies LU B and generates a corresponding device 160, designated as Device B.

In the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail herein, when acting as a target side DPA, a DPA may also enable roll back of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands or any other protocol.

DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

Host computer 104 and host computer 116 include protection agents 144 and 164, respectively. Protection agents 144 and 164 intercept SCSI commands issued by their respective host computers, via host devices to logical units that are accessible to the host computers. A data protection agent may act on an intercepted SCSI commands issued to a logical unit, in one of the following ways: send the SCSI commands to its intended logical unit; redirect the SCSI command to another logical unit; split the SCSI command by sending it first to the respective DPA; after the DPA returns an acknowledgement, send the SCSI command to its intended logical unit; fail a SCSI command by returning an error return code; and delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. Protection agents communicate with their respective DPAs by sending SCSI commands over fiber channel.

Protection agents 144 and 164 are drivers located in their respective host computers 104 and 116. Alternatively, a protection agent may also be located in a fiber channel switch, or in any other device situated in a data path between a host computer and a storage system or on the storage system itself. In a virtualized environment, the protection agent may run at the hypervisor layer or in a virtual machine providing a virtualization layer.

What follows is a detailed description of system behavior under normal production mode, and under recovery mode.

In production mode DPA 112 acts as a source site DPA for LU A. Thus, protection agent 144 is configured to act as a source side protection agent; i.e., as a splitter for host device A. Specifically, protection agent 144 replicates SCSI I/O write requests. A replicated SCSI I/O write request is sent to DPA 112. After receiving an acknowledgement from DPA 124, protection agent 144 then sends the SCSI I/O write request to LU A. After receiving a second acknowledgement from storage system 108 host computer 104 acknowledges that an I/O command complete.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

Target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 enters write transactions received by DPA 124 from DPA 112 into the journal, by writing them into the journal LU, reads the undo information for the transaction from LU B. updates the journal entries in the journal LU with undo information, applies the journal transactions to LU B, and removes already-applied transactions from the journal.

The source side storage 108 includes a delta marking stream (DMS) 196. A delta marker stream (DMS) is a stream of metadata which includes the locations that may be different between the production logical unit (e.g., LU A) and the backup logical unit (e.g., LU B) in case of a disaster (e.g., DPA failure, cable failure, WAN failure, temporary storage failure, and so forth). This includes I/Os completed to the production logical unit which have not yet been applied to the replication journal and I/Os applied to the replication journal and have not yet completed to the production logical unit.

Figure 2:
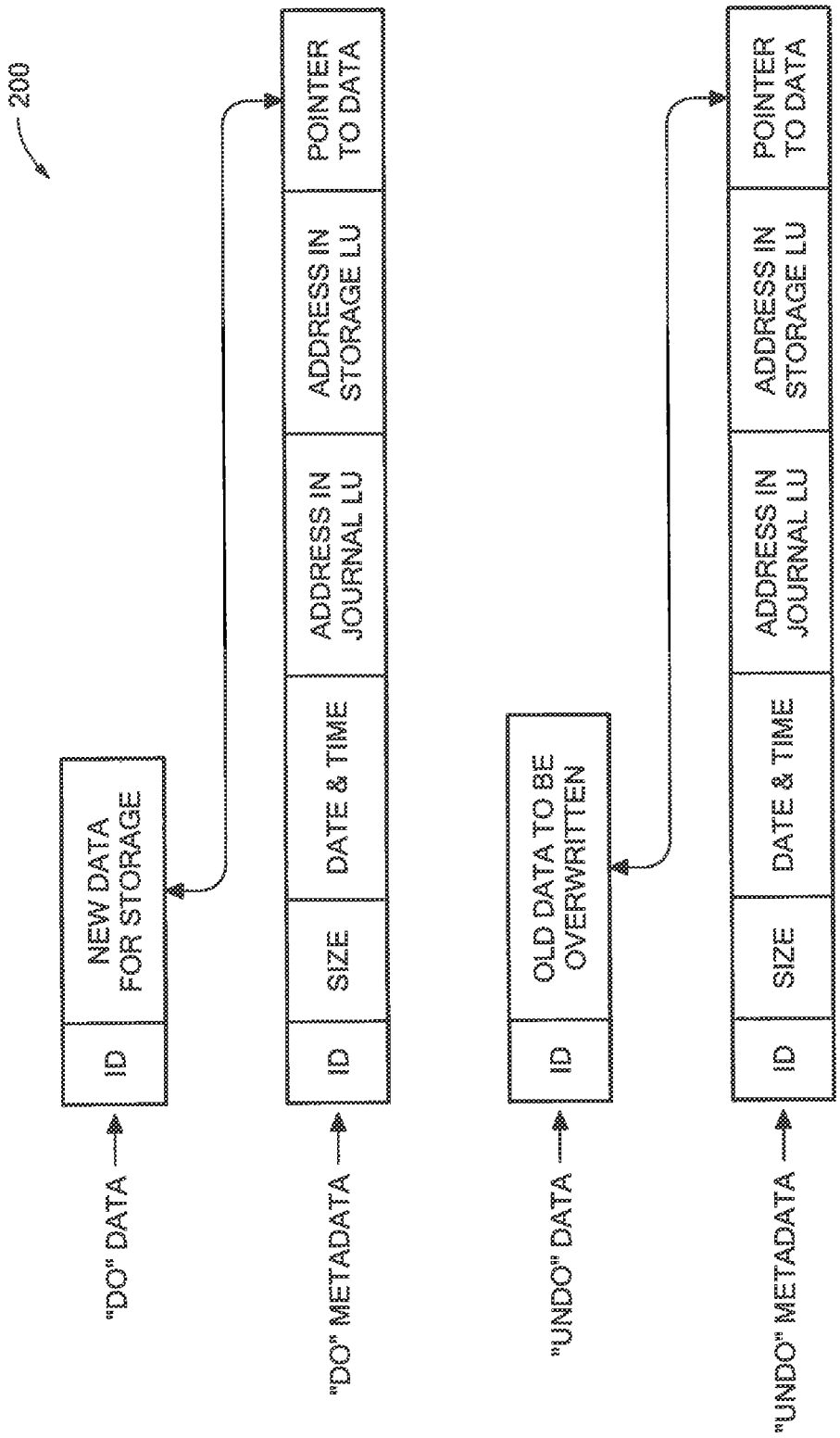
FIG. 2 is an illustration of an example of a journal history of write transactions for a storage system.

Referring to FIG. 2, which is an illustration of a write transaction 200 for a journal. The journal may be used to provide an adaptor for access to storage 120 at the state it was in at any specified point in time. Since the journal contains the "undo" information necessary to roll back storage system 120, data that was stored in specific memory locations at the specified point in time may be obtained by undoing write transactions that occurred subsequent to such point in time.

Write transaction 200 generally includes the following fields: one or more identifiers; a time stamp, which is the date & time at which the transaction was received by source side DPA 112; a write size, which is the size of the data block; a location in journal LU 176 where the data is entered; a location in LU B where the data is to be written; and the data itself.

Write transaction 200 is transmitted from source side DPA 112 to target side DPA 124. As shown in FIG. 2, DPA 124 records the write transaction 200 in the journal that includes four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the DO stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the UNDO stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream. In some examples, the metadata stream (e.g., UNDO METADATA stream or the DO METADATA stream) and the data stream (e.g., UNDO stream or DO stream) may be kept in a single stream each (i.e., one UNDO data and UNDO METADATA stream and one DO data and DO METADATA stream) by interleaving the metadata into the data stream.

Figure 3:
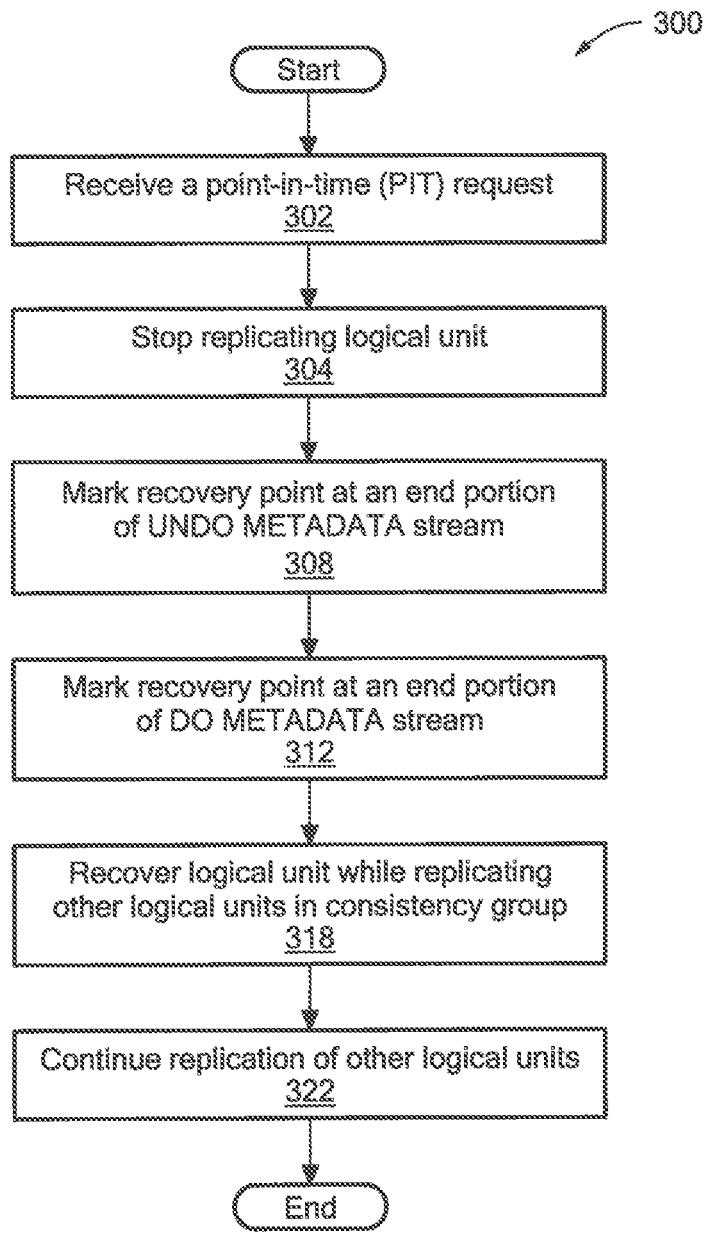
FIG. 3 is a flowchart of an example of a process to recover a logical unit in a consistency group (CG).

Referring to FIG. 3, an example of a process to recover a logical unit (physical logical unit or virtual logical unit) in a CG is a process 300. Process 300 may be used in an example where the LU A becomes corrupted but other logical units of the CG are not corrupted. In another example, the process 300 may be used in a case where a CG replicates multiple virtual machines and a single virtual machine is corrupted. While process 300 in FIG. 3 describes recovering a single logical unit in a CG, one of ordinary skill in the art would recognize that more than one logical unit in a CG may be recovered using process 300.

Process 300 receives a point-in-time (PIT) request and stops replicating a logical unit (304) e.g., production logical unit or a virtual logical unit. In one example, a user chooses a PIT that the user is confident that data on the LU A would not be corrupted and after the PIT request the replication of LU A is stopped. In other examples, a user may select and test multiple points-in-time until the user finds a point-in-time which is not corrupted.

Figure 4:
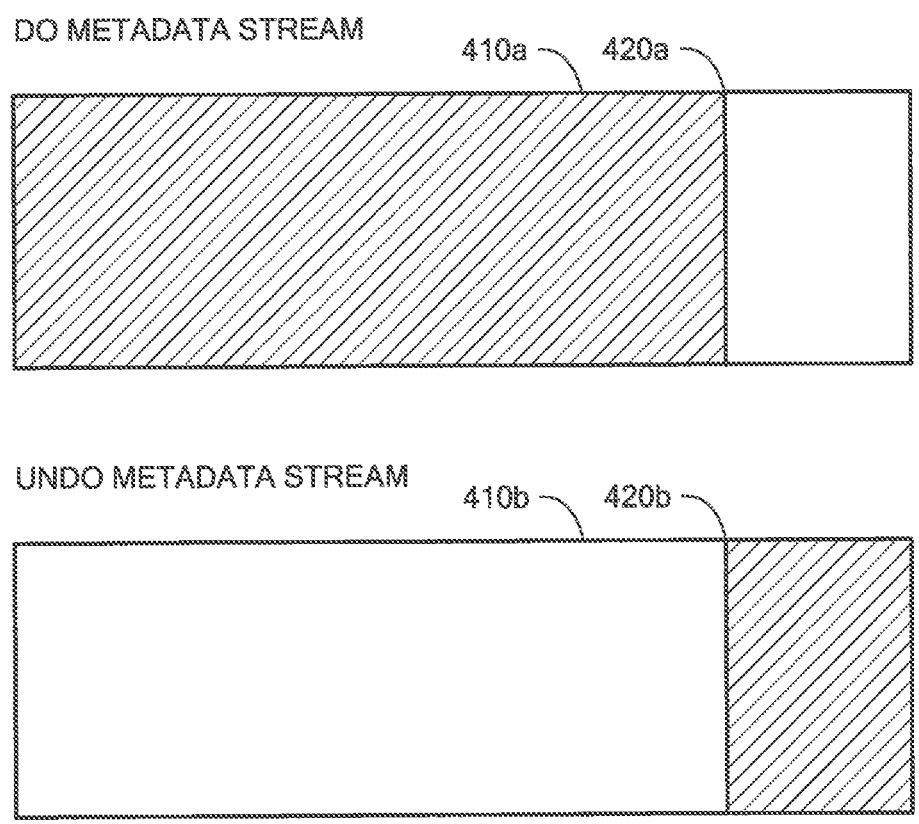
FIG. 4 is a diagram of the DO and UNDO METADATA streams at the backup site associated with the backup logical unit.

Referring to FIGS. 3 and 4, process 300 marks a first recover point 420a at an end of the UNDO METADATA stream 410b corresponding to the PIT (308) and marks a second recovery point 420b at an end of the DO METADATA stream 410a corresponding to the PIT (312). As shown in FIG. 4, the shaded areas in the DO METADATA stream 410a and the UNDO METADATA stream 410b represent areas in the journal with corrupted data for the logical unit being recovered. The logical unit will be recovered up to the first recover point and all data in the journal between the first and second recovery points will be discarded from the journal for the logical unit.

Referring to FIG. 3, process 300 recovers the logical unit while replicating the other logical units in the CG (318), i.e., the data differences between the backup (replicated) copy (e.g., LU B) of the logical unit and the logical unit (e.g., LU A) are copied back to the logical unit. In one example, the process 300 recovers the LU A by following a process 600. Process 300 continues replicating the other logical units in the CG by writing new data entries for the logical units to the DO stream and applying the data to data stream to the replicated logical units. (322). As one of ordinary skill in the art would appreciate, while another logical unit is being recovered, process 300 allows no interruption to the replication of other logical units nor is their respective journaling lost.

When data is applied from the DO stream to the replicated logical unit, journal entries for the recovered logical unit which are between the two recovery points marked in processing blocks 308 and 312 are discarded.

Figure 5:
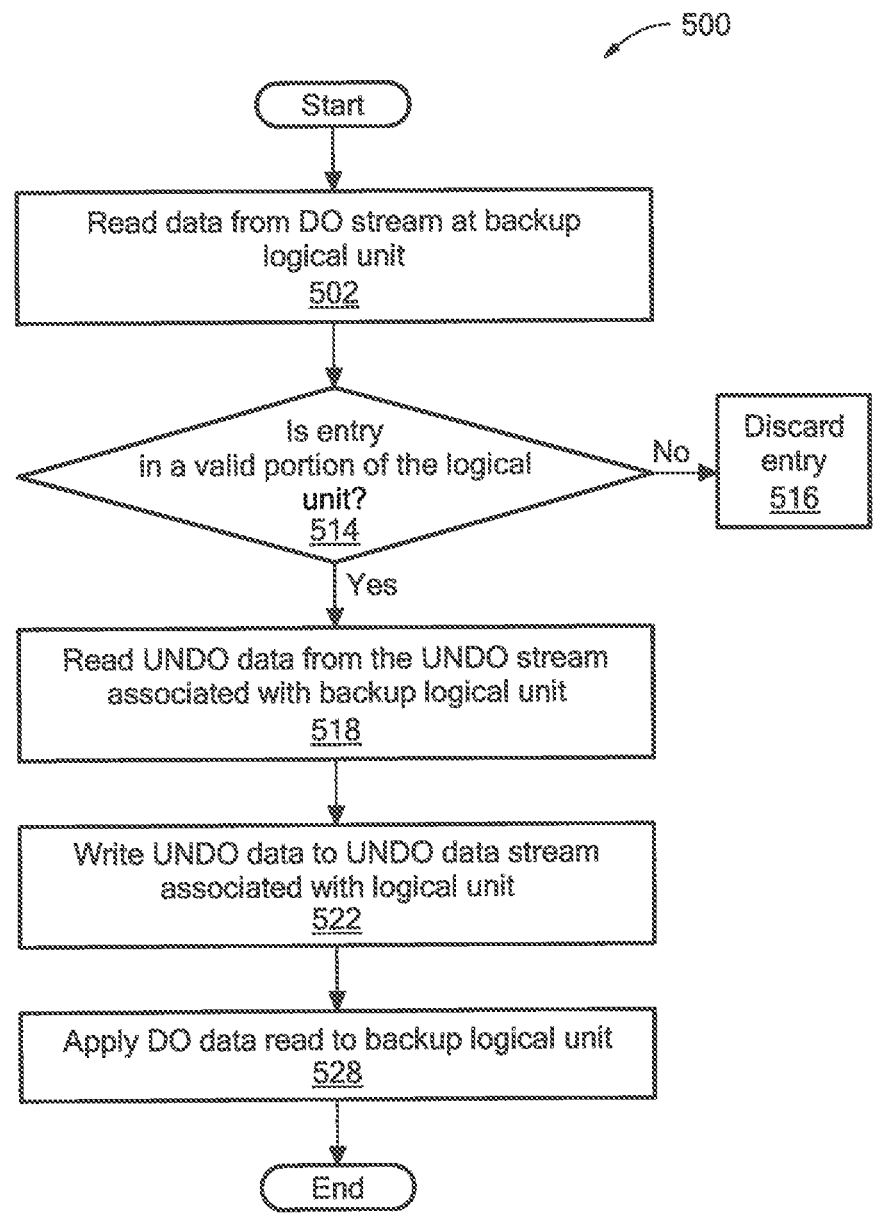
FIG. 5 is a flowchart of an example of a process to distribute data from the DO stream to a backup logical unit when a logical unit is recovered.

Referring to FIG. 5, a process 500 is an example of a process to distribute data from the DO stream to the backup logical unit (e.g., LU B) when a logical unit is recovered since all the data between the marks generated in processing blocks 308, 312 needs to be discarded. Process 500 reads data from the DO stream located at the replication (backup) site (502). The DO stream located at the replication site includes changes that need to be applied to the backup logical unit.

For each write transaction entry, process 500 determines if the entry is in a valid portion of the logical unit (i.e., the entry is in a valid area of the journal. For example, entries for a recovered production logical unit are not valid from the mark generated at the end portion of the UNDO METADATA stream (see processing block 308) until the mark generated at the end portion of the DO METADATA stream (see processing block 312) (514) (i.e., the areas shaded in FIG. 4).

If the entry is not in a valid for logical unit (i.e., the write transaction entry is in the journal area that was discarded due to recovery of production logical unit), the entry is discarded (516).

If the entry is in a valid portion of the logical unit, i.e., the entry is not for a logical unit being recovered in this area of the journal, process 500 reads the UNDO data of the DO data read in processing block 502 from the UNDO stream associated the backup logical unit (518).

Process 500 writes the UNDO data from the UNDO stream associated with the backup logical unit to the UNDO stream of the logical unit (522).

Process 500 applies the new write transaction read at processing block 502 to the backup logical unit (528)

Figure 6:
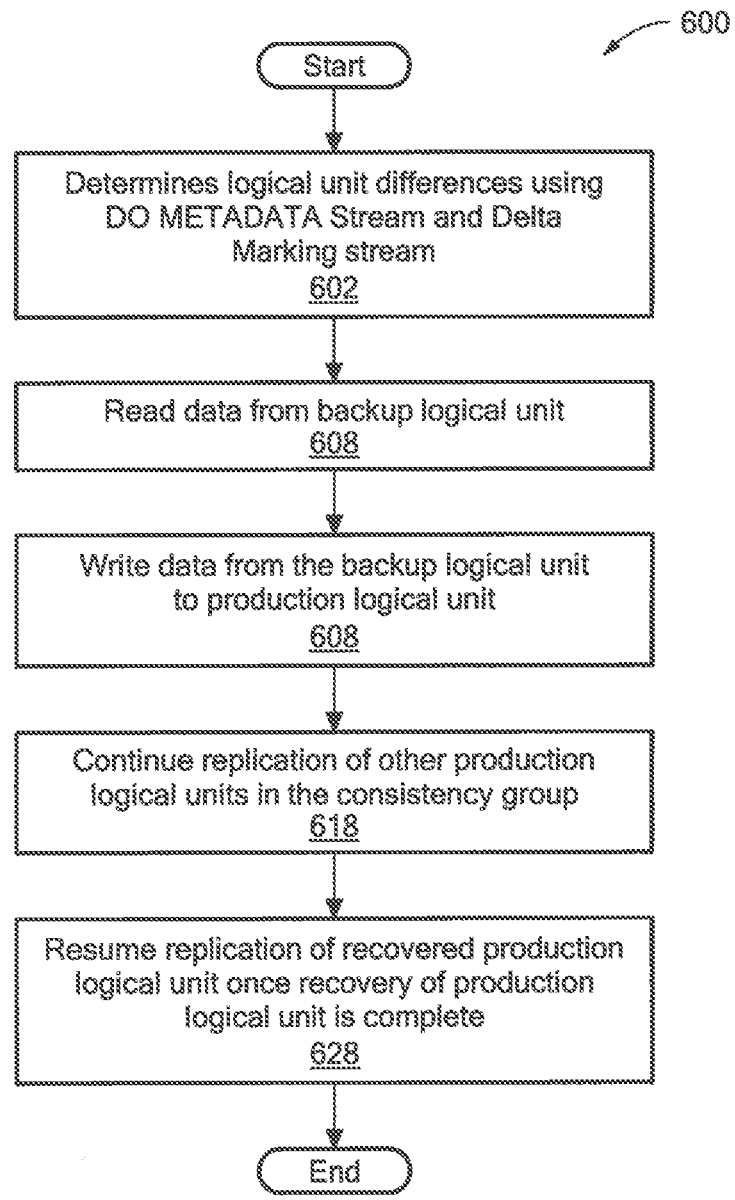
FIG. 6 is a flowchart of one particular example of a performing at least a portion of the process in FIG. 3.

Referring to FIG. 6, an example of performing the processing in processing block 318 (FIG. 3) is a process 600. The process 600 determines logical unit differences using the DO METADATA and the delta marking stream (602). For example, a set of differences between the backup logical unit and the production logical unit is a list of changes tracked in the production delta marker stream 196, and the list of changes in the DO METADATA stream. These lists include the offset of a change and the size of the change, and together they include all the differences between the production and backup logical units.

This process occurs after the production logic unit stops receiving new I/Os and the production host or virtual machine using the production logical unit is brought down or stop using the production logic unit.

Process 600 reads data from the backup logical unit (e.g., LU B) (608), writes data from the backup logical unit to the production logical unit (e.g., LU A) (612) and continues replication of the other production logical units in the CG (618). Once the production logical unit recovery process is complete, process 600 resumes replicating the production logical unit (628). Since during process 500 the recovered logical unit is not changed, process 500 may occur while recovering the production logical unit in process 600.

Figure 7:
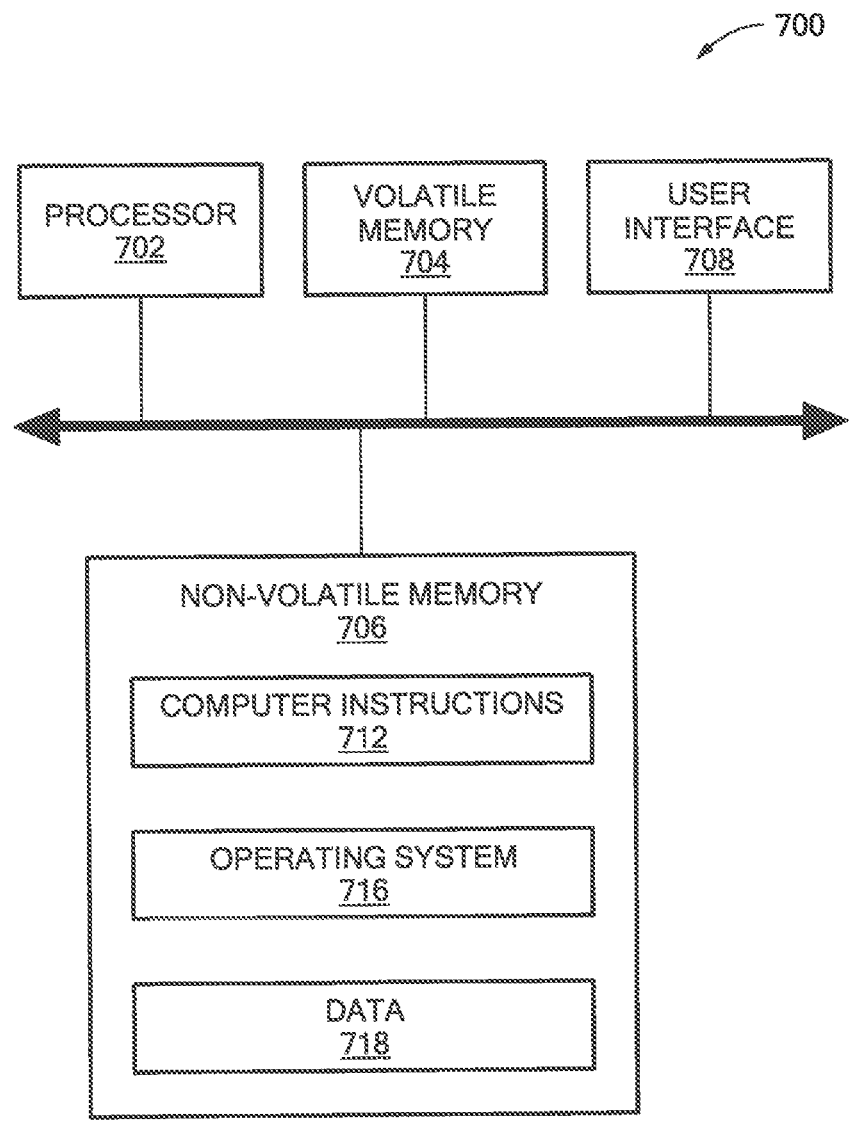
FIG. 7 is a computer on which the processes of FIGS. 3, 5 and 6 may be implemented.

Referring to FIG. 7, a computer 700 includes a processor 702, a volatile memory 704, a non-volatile memory 706 (e.g., hard disk) and a user interface (UI) 708 (e.g., a mouse, a keyboard, a display, touch screen and so forth). The non-volatile memory 706 stores computer instructions 712, an operating system 716 and data 718. In one example, the computer instructions 712 are executed by the processor 702 out of volatile memory 704 to perform all or part of the processes described herein (e.g., processes 300, 500 and 600).

The processes described herein (e.g., processes 300, 500 and 600) are not limited to use with the hardware and software of FIG. 7; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 300, 500 and 600 are not limited to the specific processing order of FIGS. 3, 5 and 6, respectively. Rather, any of the processing blocks of FIGS. 3, 5 and 6 may be re-ordered, combined or removed, performed in parallel or in serial, as necessary, to achieve the results set forth above.

The processing blocks (for example, in the processes 300, 500 and 600) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A method comprising:
    recovering at least one logical unit of a consistency group in a journal-based replication system without interruption of replication of other logical units in the consistency group, the at least one logical unit being one of a physical logical unit or a virtual logical unit;
    receiving a request to recover a logical unit in the consistency group at a point-in-time (PIT);
    ceasing replication of the logical unit to a backup logical unit;
    recovering the logical unit at the PIT while continuing replicating other logical units in the CG;
    marking a first recovery point at an end portion of an UNDO METADATA stream associated with the PIT;
    marking a second recovery point at an end portion of a DO METADATA stream associated with the PIT; and
    generating differences between the production logical unit and the backup logical unit by joining the metadata in a local delta marker stream and the data in the DO metadata stream associated with the production logical unit.

2. The method of claim 1, further comprising copying the differences from the backup logical unit to the production logical unit.

3. The method of claim 2, further comprising, after the production logical unit is recovered:
    accepting new I/O requests; and
    replicating the new I/Os.

4. A method comprising:
    recovering at least one logical unit of a consistency group in a journal-based replication system without interruption of replication of other logical units in the consistency group, the at least one logical unit being one of a physical logical unit or a virtual logical unit;
    receiving a request to recover a logical unit in the consistency group at a point-in-time (PIT);
    ceasing replication of the logical unit to a backup logical unit;
    recovering the logical unit at the PIT while continuing replicating other logical units in the CG;
    marking a first recovery point at an end portion of an UNDO METADATA stream associated with the PIT;
    marking a second recovery point at an end portion of a DO METADATA stream associated with the PIT;
    reading data from a write transaction entry in a DO stream;
    determining if the write transaction entry is between the first recovery point and the second recovery point; and
    discarding the write transaction entry if the write transaction entry is between the first recovery point and the second recovery point; and
    if the write transaction entry is not between the first recovery point and the second recovery point:
        reading data from an UNDO stream for the backup logical unit;
        writing the UNDO data read from the logical unit to the UNDO stream of the production logical unit; and
        applying the write transaction read from the DO stream to the backup logical unit, if the entry is to a device different than the recovered device.

5. An article comprising:
    a non-transitory machine-readable medium that stores executable instructions, the instructions causing a machine to:
        recover at least one logical unit of a consistency group in a journal-based replication system without interruption of replication of other logical units in the consistency group, the at least one logical unit being one of a physical logical unit or a virtual logical unit;
        receive a request to recover a logical unit in the consistency group at a point-in-time (PIT);
        cease replication of the logical unit to a backup logical unit;
        recover the logical unit at the PIT while continuing replicating other logical units in the CG;
        mark a first recovery point at an end portion of an UNDO METADATA stream associated with the PIT;
        mark a second recovery point at an end portion of a DO METADATA stream associated with the PIT; and
        generate differences between the production logical unit and the backup logical unit by joining the metadata in a local delta marker stream and the data in the DO metadata stream associated with the production logical unit.

6. The article of claim 5, further comprising instructions causing the machine to:
    read data from a write transaction entry in a DO stream;
    determine if the write transaction entry is between the first recovery point and the second recovery point; and
    discard the write transaction entry if the write transaction entry is between the first recovery point and the second recovery point; and
    if the write transaction entry is not between the first recovery point and the second recovery point:
        read data from an UNDO stream for the backup logical unit;
        write the UNDO data read from the logical unit to the UNDO stream of the production logical unit; and
        apply the write transaction read from the DO stream to the backup logical unit, if the entry is to a device different than the recovered device.

7. The article of claim 5, further comprising instructions causing the machine to:
    copy the differences from the backup logical unit to the production logical unit; and
    after the production logical unit is recovered;
        accept new I/O requests; and
        replicate the new I/Os.

8. An apparatus, comprising:
    circuitry configured to:
        recover at least one logical unit of a consistency group in a journal-based replication system without interruption of replication of other logical units in the consistency group, the at least one logical unit being one of a physical logical unit or a virtual logical unit;
        receive a request to recover a logical unit in the consistency group at a point-in-time (PIT);

cease replication of the logical unit to a backup logical unit; and recover the logical unit at the PIT while continuing replicating other logical units in the CG;

mark a first recovery point at an end portion of an UNDO METADATA stream associated with the PIT;

mark a second recovery point at an end portion of a DO METADATA stream associated with the PIT; and generate differences between the production logical unit and the backup logical unit by joining the metadata in a local delta marker stream and the data in the DO metadata stream associated with the production logical unit.

9. The apparatus of claim 8 wherein the circuitry comprises at least one of a processor, a memory, programmable logic and logic gates.

10. The apparatus of claim 8, wherein the circuitry is further configured to:

read data from a write transaction entry in a DO stream;

determine if the write transaction entry is between the first recovery point and the second recovery point; and discard the write transaction entry if the write transaction entry is between the first recovery point and the second recovery point; and if the write transaction entry is not between the first recovery point and the second recovery point:

read data from an UNDO stream for the backup logical unit;

write the UNDO data read from the logical unit to the UNDO stream of the production logical unit; and apply the write transaction read from the DO stream to the backup logical unit, if the entry is to a device different than the recovered device.

11. The apparatus of claim 8, wherein the circuitry is further configured to:

copy the differences from the backup logical unit to the production logical unit; and after the production logical unit is recovered:

accept new I/O requests; and replicate the new I/Os.

\* \* \* \* \*